United States Patent
Matsuura et al.

(10) Patent No.: US 6,808,277 B2
(45) Date of Patent: Oct. 26, 2004

(54) INNER MIRROR WITH BUILT-IN ANTENNA

(75) Inventors: Masaaki Matsuura, Fujieda (JP); Hidenori Sato, Fujieda (JP)

(73) Assignee: Murakami Corporation, Shizuoka (JP)

( * ) Notice: Subject to any disclaimer, the term of this patent is extended or adjusted under 35 U.S.C. 154(b) by 64 days.

(21) Appl. No.: 10/270,012

(22) Filed: Oct. 15, 2002

(65) Prior Publication Data
US 2003/0090820 A1 May 15, 2003

(30) Foreign Application Priority Data
Nov. 15, 2001 (JP) .................................. 2001-350032

(51) Int. Cl.[7] .............................................. G02B 7/182
(52) U.S. Cl. ...................... 359/872; 359/838; 359/871; 359/876; 343/713
(58) Field of Search ................................. 235/380, 379, 235/384; 343/13, 713; 359/876, 871, 872, 838

(56) References Cited
U.S. PATENT DOCUMENTS 4,050,776 A * 9/1977 Hsu ............................ 359/876
6,547,133 B1 * 4/2003 DeVries et al. ............. 235/380

* cited by examiner

Primary Examiner—Audrey Chang
Assistant Examiner—Craig Curtis
(74) Attorney, Agent, or Firm—Oblon, Spivak, McClelland, Maier & Neustadt, P.C.

(57) ABSTRACT

The present invention provides an inner mirror with a built-in antenna in which an antenna angle remains unchanged regardless of adjustment of a mirror angle. The upper end of a stay 10 is mounted on a ceiling in a vehicle room. A pivot 14 is formed at the lower end of the stay 10. The pivot 14 is inserted into a mirror body 16 and fitted into a pivot supporting pmember 20 to support the mirror body 16 pivotally in three-dimensional directions. An antenna 34 is mounted on one side of the pivot 14 through shafts 28 and 30. Since the antenna 34 is mounted on the pivot 14, the angle of the antenna 34 remains unchanged, even though the mirror angle adjustment is performed by pivoting the mirror body 16.

10 Claims, 5 Drawing Sheets

INNER MIRROR WITH BUILT-IN ANTENNA

BACKGROUND OF THE INVENTION FIELD OF THE INVENTION

The present invention relates to an inner mirror with a built-in antenna for a vehicle. More particularly, the present invention relates to an inner mirror with a built-in antenna in which an antenna angle remains unchanged irrespective of adjustment of a mirror angle.

DESCRIPTION OF THE RELATED ART

A vehicle-mounted equipment for the Electronic Toll Collection System (hereinafter, referred to as "ETC vehicle-mounted equipment") consists of a main body of the vehicle-mounted equipment and an antenna. Generally, the ETC vehicle-mounted equipment is installed on an instrument panel. However, if it is built in an inner mirror, an obstacle disappears on the instrument panel, so that easy driving and improved appearance are provided. The ETC vehicle-mounted equipment, the antenna of the ETC vehicle-mounted equipment has a strong directivity. Therefore, if it is not mounted at an angle of approximately 20° in the up and down direction and parallel to the left and right direction with respect to a vehicle running direction, therer is a problem in that a stable communication can not be provided. In contrast, since a whole mirror body of an inner mirror is pivotally disposed relative to a stay so that mirror angle adjustment can be made. The antenna direction is changed when the ETC vehicle-mounted equipment is built in and a user adjusts a mirror angle. As a result, there is a problem to be unable to ensure a stable communication.

SUMMARY OF THE INVENTION

The present invention is directed to overcoming the above-stated problems. An object of the present invention is to provide an inner mirror with a built-in antenna such that an antenna angle remains unchanged, even though a mirror moves within a mirror body for adjusting a mirror angle.

According to one aspect of the present invention, there is provided an inner mirror with a built-in antenna comprising a mirror body provided with a mirror at the front thereof; a stay mounted at one end on an appropriate place in a vehicle room and inserted at the other end into the mirror body for pivotally mounting and supporting said mirror body at the other end; and an antenna mounted on a portion of the stay inserted into the mirror body such that the antenna does not interfere with the pivoting movement of the mirror body within said mirror body.

With this arrangement, the antenna is mounted on the portion of the stay inserted into the mirror body such that the antenna does not interfere with the mirror body even though a mirror body moves within a mirror body for adjusting a mirror angle. Therefore, the antenna direction remains unchanged. This allows to obtain a stable communication.

According to the other aspect of the present invention, there is provided an inner mirror with a built-in antenna comprising a stay mounted in a vehicle room, a first gear non-pivotally and fixedly disposed at the tip end of the stay with its axis being directed toward the lateral direction of a vehicle; a mirror body supported in the first gear pivotally around the axis of the first gear, and provided with a mirror at the front thereof; multi-stage gears pivotally supported in said mirror body, engaged with the first gear, and rotated while they follow pivoting movement of the mirror body, wherein the axis of a final stage gear is disposed parallel to the axis of the first gear; and an antenna received into the mirror body and mounted on the final stage gear, wherein a total gear stage number and a total gear ratio are set so that when the mirror body has been pivoted in the direction around the axis of the first gear, said final stage gear does not rotate relative to the first gear.

With this arrangement, since the total gear stage number and the total gear ratio are set so that when the mirror body has been pivoted around the axis of the first gear, the final stage gear does not rotate relative to the first gear. The antenna direction remains unchanged even though the mirror angle in the up and down direction is adjusted by pivoting the mirror body in the up and down direction. This allows to bring a stable communication. The total gear stage number may be set, for example, to be odd number stages. The total gear ratio may be set, for example, to be 1.

According to another aspect of the present invention, there is provided an innermirror with a built-in antenna comprising a stay mounted in a vehicle room, a first gear non-pivotally and fixedly disposed at the tip end of the stay with its axis being directed toward the up and down direction; a mirror body supported in the first gear pivotally in the direction around the axis of the first gear, and provided with a mirror at the front thereof; multi-stage gears rotatably supported in the mirror body, engaged with the first gear, and rotated while they follow pivoting movement of the mirror body, wherein the axis of a final stage gear is disposed parallel to the axis of the first gear, and an antenna received into the mirror body and mounted on the final stage gear, wherein a total gear stage number and a total gear ratio are set so that when said mirror body has been pivoted around the axis of the first gear, the final stage gear does not rotate relative to the first gear.

With this arrangement, since the total gear stage number and the total gear ratio are set so that when the mirror body has been pivoted in the direction around the axis of the first gear, the final stage gear does not rotate relative to the first gear. Accordingly the antenna direction keeps unchanged, even though the mirror angle in the left and right direction is adjusted by pivoting the mirror body in the left and right direction. This brings a stable communication. The total gear stage number may be set, for example, to be odd number stages. The total gear ratio may be set, for example, to be 1.

DESCRIPTION OF THE PREFERRED EMBODIMENTS

Figure 1:
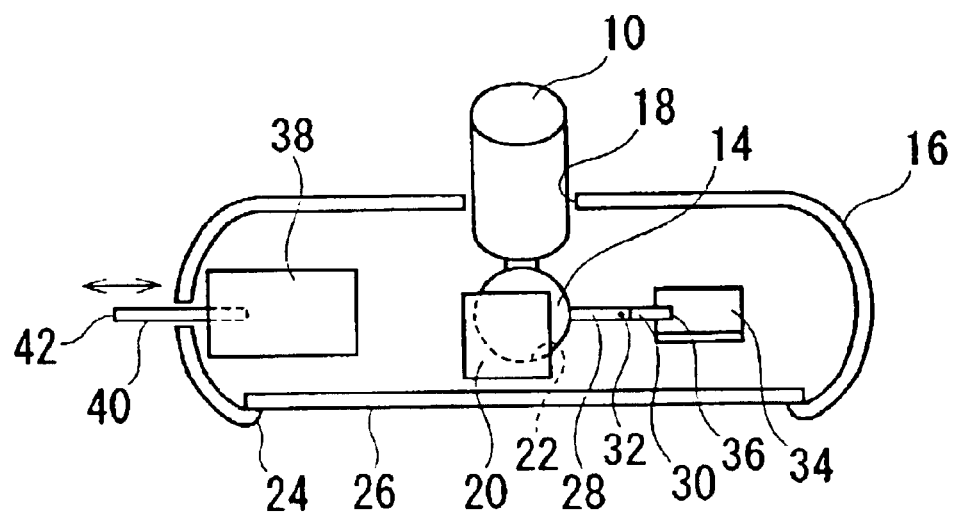
FIG. 1 is a plan view showing a configuration within a mirror body according to a first embodiment of the present invention.
Figure 2:
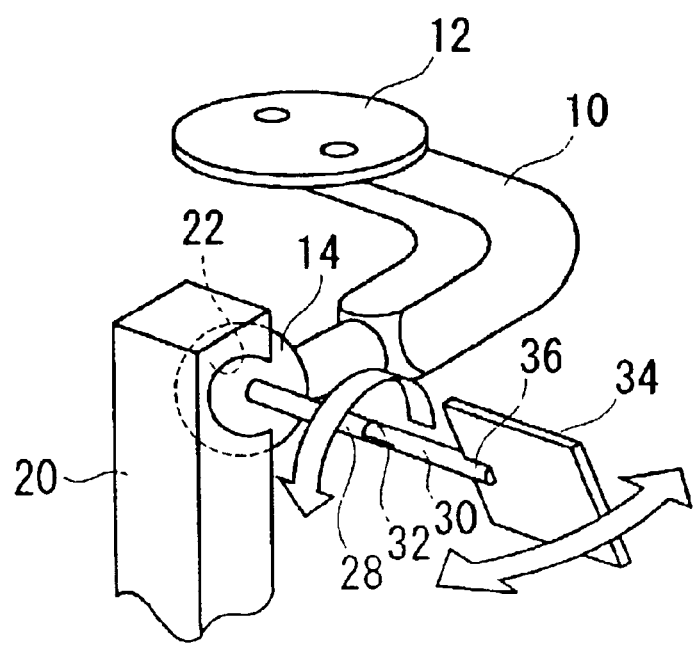
FIG. 2 is a perspective view showing a mounting structure of an antenna with respect to a stay of FIG. 1.
Figure 3:
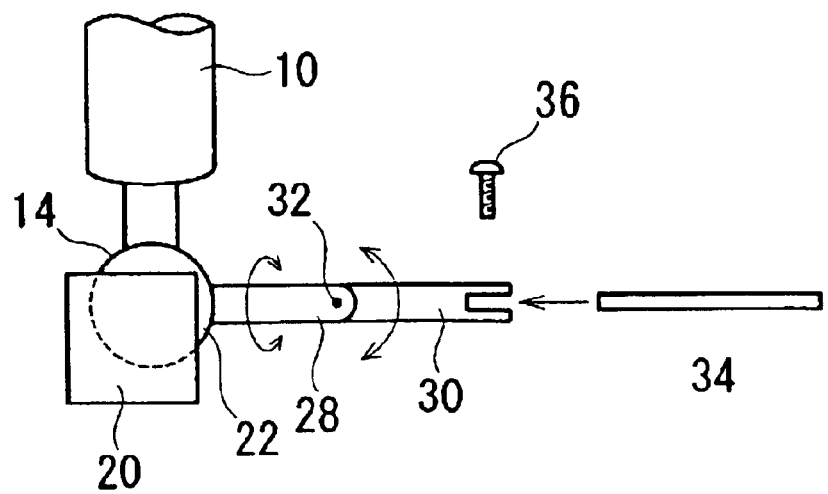
FIG. 3 is a plan view showing a mounting structure of an antenna with respect to a stay of FIG. 1.
Figure 4:
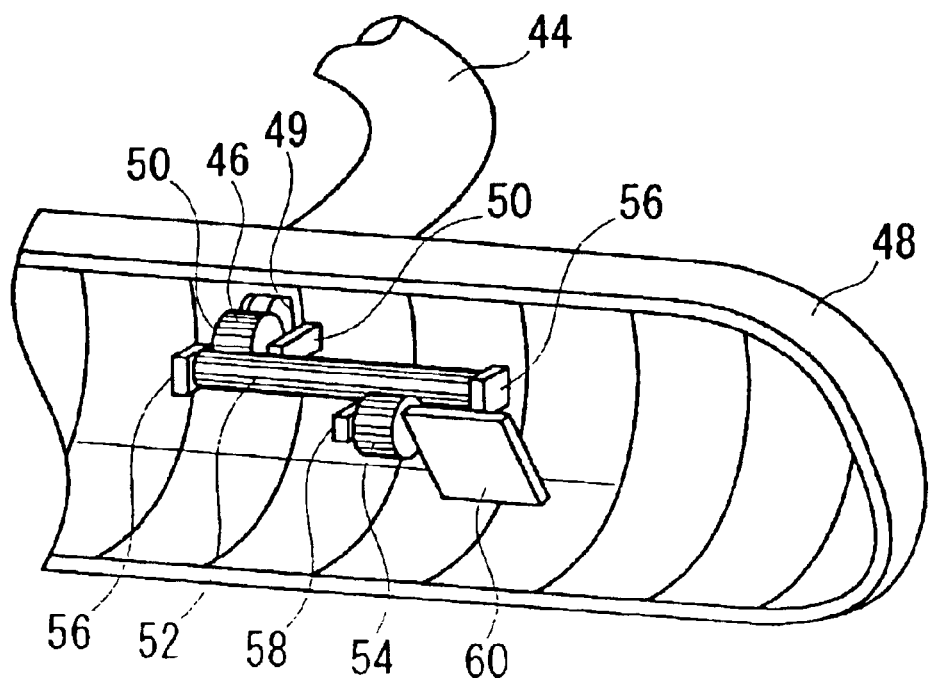
FIG. 4 is a perspective view showing a configuration within a mirror body according to a second embodiment of the present invention.
Figure 5:
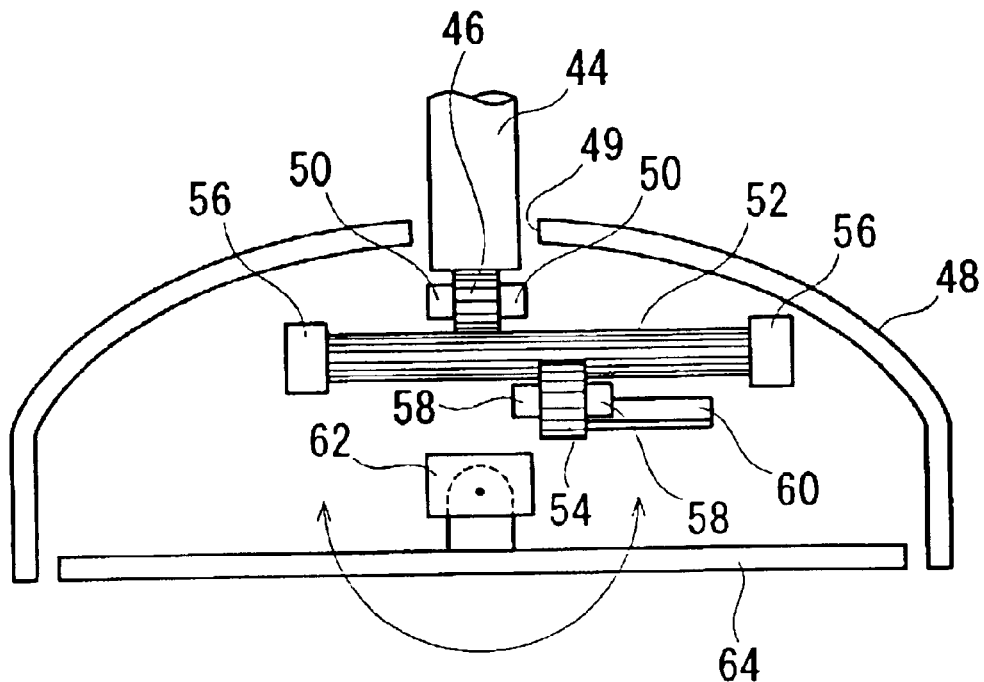
FIG. 5 is a plan view showing a configuration within the mirror body of FIG. 4.

In FIGS. 1 to 3, a first embodiment of an inner mirror of the present invention is shown. A stay 10 has a mounting portion 12 formed at the upper end thereof. The mounting portion 12 is mounted on a ceiling and the like in a vehicle room by screw fixing and so on. A pivot 14 is formed at the lower end of the stay 10. The pivot 14 is inserted into a mirror body 16 through an inserting hole 18 which is formed at the back of the mirror body 16. The mirror body 16 has a pivot supporting portion 20 fixedly formed in the inner peripheral surface thereof. A concave portion 22 is formed in the pivot support portion 20 for receiving the pivot 14. The pivot supporting portion 20 supports the mirror body 16 so that the mirror body 16 can be pivoted about the pivot 14 in three-dimensional directions after the pivot 14 is fitted into the concave portion 22. A mirror 26 which constitutes a mirror main body is fixedly fitted into a front aperture 24 of the mirror body 16.

A shaft 28 is mounted at one side of the pivot 14 so that the shaft 14 can be rotated around its axis. Another shaft 30 is connected to the tip end of the shaft 28 so that the shaft 30 can be pivoted about a connecting portion 32, that is, curved relative to the shaft 28. An antenna 34 having a plate-like antenna is mounted at the tip end of the shaft 30 with a screw 36. The antenna 34 is mounted on the shaft 30 such that the axis of the connecting portion 32 is disposed along a plane of the antenna 34. The shafts 28 and 30 constitute an antenna mounting angle adjustment mechanism. That is, an angle of the antenna 34 in the up and down direction can be adjusted by a rotating angle of the shaft 28 in the direction around its axis. An angle of the antenna 34 in the left and right direction can be adjusted by a pivoting angle of the shaft 30 about the connecting portion 32. A main body 38 of an ETC vehicle-mounted equipment is installed within the mirror body 16. A card inserting opening 40 is formed at one side of the mirror body 16. An IC card 42 used with an ETC system is inserted and mounted from the outside through the card inserting opening 40 into the main body 38 of the ETC vehicle-mounted equipment.

With the above-mentioned arrangement, when this inner mirror an angle of the anntena member 34 in the up and down direction or the left and right direction is previously adjusted at a pre-angle such that the plane of the antenna portion 3 has a certain angle in the up and down direction and is parallel to the lateral direction of the vehicle in the left and right direction in a state that it is mounted on a vehicle. In the state that the inner mirror is mounted on a vehicle, a user can adjust a mirror angle by pivoting the mirror body 16 about the pivot 14. Since the antenna portion 34 is supported in the pivot 14 through the shafts 28 and 30, the angle of the antenna 34 remains unchanged even though the mirror angle adjustment is carried out.

In addition, shapes and arrangements of the antenna portion 34, the shafts 28 and 30 and other parts, such as an inner wall surface of the mirror body 16, the pivot supporting portion 20, the mirror 26, and others, within the mirror body 16 are designed such that the antenna 34 or the shafts 28 and 30 do not touch with the other parts which locate within the mirror body 16 while the mirror angle adjustment is performed.

In FIGS. 4 to 7, a second embodiment of the present invention is shown. A stay 44 is so configured that a mounting portion (not shown) at the upper end thereof is mounted on a ceiling and the like in a vehicle room by screw fixing and the like. Gear 46 is non-pivotally and fixedly disposed at the lower end of the stay 44 with its axis being directed toward the horizontal direction and the lateral direction of a vehicle. The Gear 46 is inserted into a mirror body 48 through an inserting hole 49 formed at the back thereof. The gear 46 is supprted on a set of bearings 50, 50 which is formed at the inner wall surface of the mirror body 48, and supports the mirror body 48 so that the mirror body 48 can be pivoted in the up and down direction and around the axis thereof. Gears 52, 54 are disposed within the mirror body and 48. The gear 52 is rotatably support-ed on a set of bearings 56 which is formed at the wall surface of the mirror body 48, and the gear 54 is rotatably supported on a set of bearings 58, 58 which is formed at the inner wall surface of the mirror body 48. The axes of the gears 52 and 54 are parallel to the axis of the gear 46. The gear 46 is engaged with the gear 52 which in turn is engaged with the gear 54. A gear ratio of the front gear 46 to the intermediate gear 52 is that of the rear gears 54 to the intermediate gear 52 is equal to each other. A total gear ratio of the three-stage gears 46, 52 and 54 is equal to 1, where the number of teeth of the gear 46 and the number of teeth of the gear 54 are equal to each other. In the one side surface of the final stage gear 54 an antenna member 60 having a plate-like antenna is fixedly disposed such that the plane of the antenna member 60 has a certain angle in the up and down direction and is parallel to the lateral direction of a vehicle in the left and right direction. A mirror supporting member 62 is fixed in the inner peripheral surface of mirror body 48. The mirror support member 62 constitutes a mirror angle adjustment mechanism, and supports a mirror 64 pivotally in the left and right direction.

Figure 6:
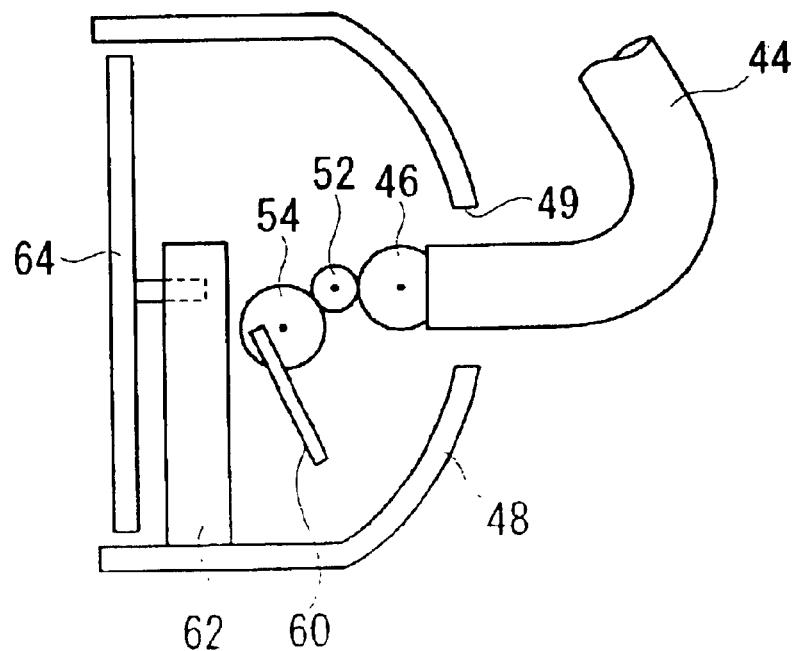
FIG. 6 is a side view showing a configuration within the mirror body of FIG. 4.
Figure 7:
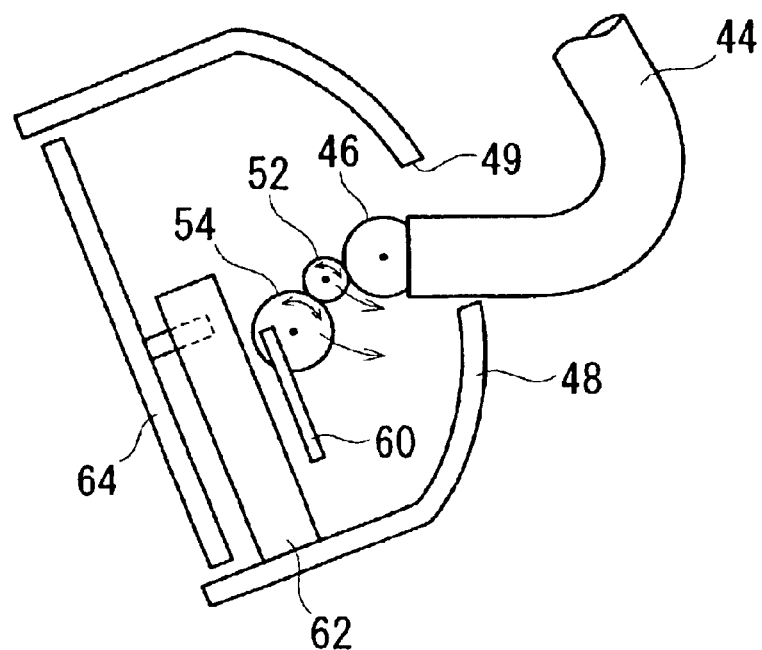
FIG. 7 is a side view showing a configuration within the mirror body when the mirror body has been pivoted downwardly from the posture of FIG. 6.

With the above-mentioned arrangement, the mirror angle adjustment in the up and down direction is performed by pivoting the mirror body 48 about the axis of the gear 46 in the up and down direction. FIG. 7 shows that a mirror angle adjustment in the downward direction is performed from the posture as shown in FIG. 6. The gears 52 and 54 follow the pivoting movement of the mirror body 48, and rotate on their own axes or rotate around the gear 46. Since the gear ratio of the front gear 46 to the intermediate gear 52 and the gear ratio of the rear gear 54 to the intermediate gear 52 are set to be equal to each other, the final-stage gear 54 does not rotate relative to the first stage gear46. As a result, the angle of the antenna portion 60 remains unchanged.

The mirror angle adjustment in the left and right direction can be performed by pivoting the mirror 64 in the left and right direction relative to the mirror support member 62. These angle adjustment mechanisms in the up and down direction and the left and right directions are designed to generate an appropriate frictional force so that the adjusted angle can be unchanged.

Figure 8:
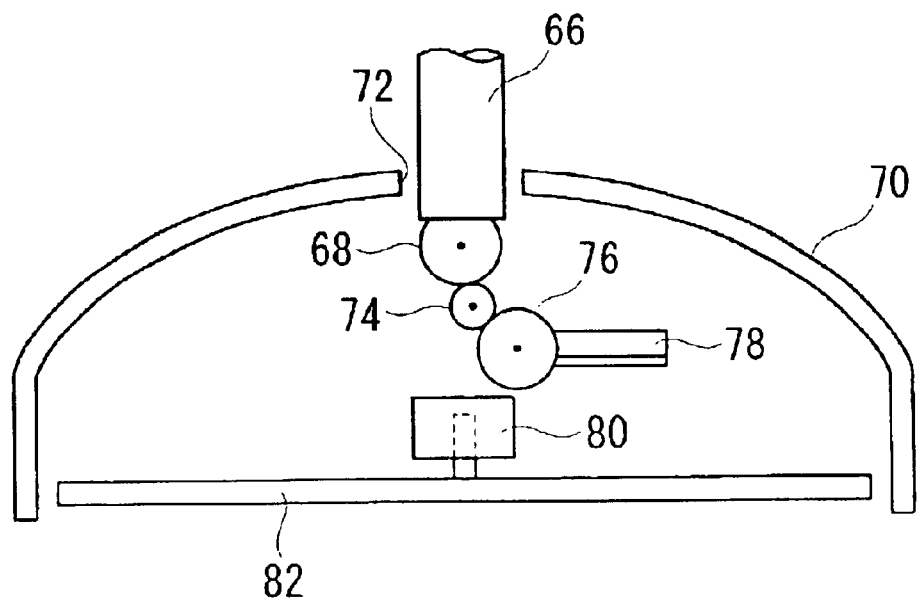
FIG. 8 is a plan view showing a configuration within a mirror body according to a third embodiment of the present invention.
Figure 9:
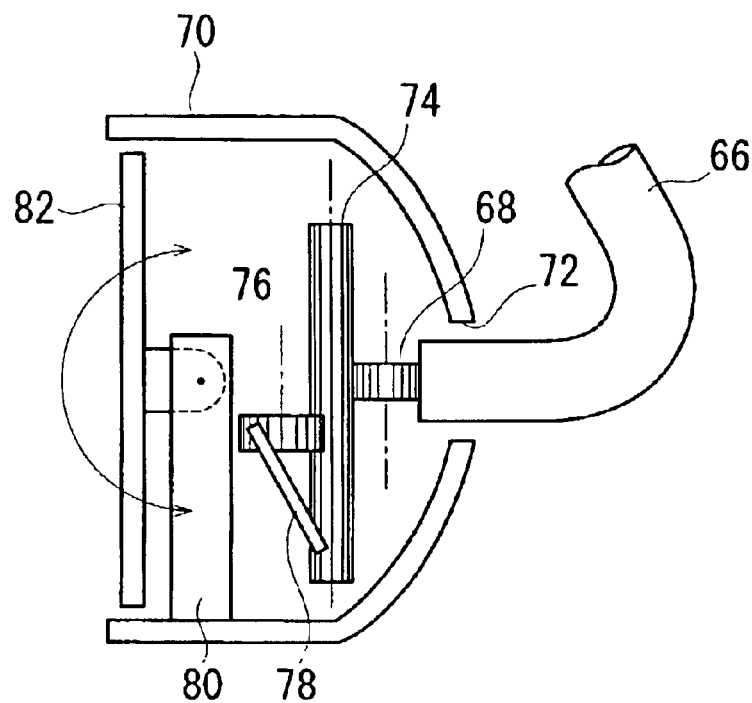
FIG. 9 is a side view showing a configuration within the mirror body of FIG. 8.
Figure 10:
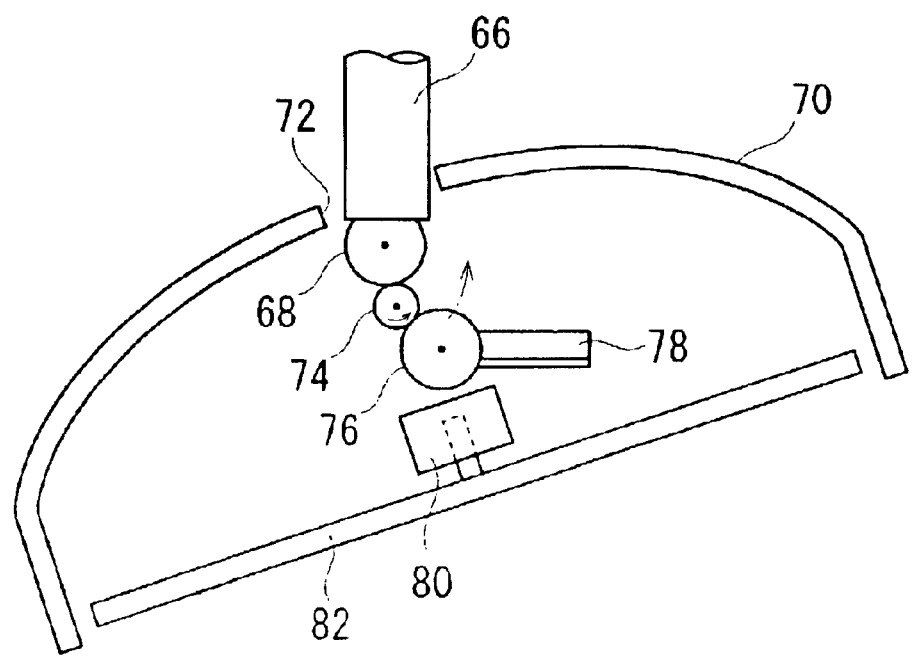
FIG. 10 is a plan view showing a configuration within the mirror body when the mirror body has been pivoted in the right direction from the posture of FIG. 8.

In FIGS. 8 to 10, a third embodiment of an inner mirror of the present invention is shown. A stay 66 is so configured that a mounting portion (not shown) at the upper end thereof is mounted on a ceiling and the like in a vehicle room by screw fixing and like. A gear 68 is non-pivotally and fixedly disposed at the lower end of the stay 66 with its axis being directed toward the vertical direction.

The gear 68 is inserted into a mirror body 70 through an inserting hole 72 which is formed at the back of the mirror body 70. The gear 68 is supported on a set of bearing (not shown) which is formed at the inner wall surface of the mirror body 70, and supports the mirror body 70 so that the mirror body can be pivoted in the direction around the axis thereof, that is, in the left and right direction. Gears 74 and 76 are disposed within the mirror body 70. The gears 74 and 76 are rotatably supported on bearings (not shown), respectively, which are formed at the inner wall surface of the mirror body 70. The axes of the gears 74 and 76 are parallel to the axis of the gear 68. The gear 68 is engaged with the gear 74 which in turn is engaged with the gear 76. A gear ratio of the front gear 68 to the intermediate gear 74 and a gear ratio of the rear gears 76 to the intermediate gear 74 are equal to each other. Since the number of teeth of the gear 68 and the number of teeth of the gear 76 are equal to each other. Accordingly a total gear ratio of the three-stage gears 68, 74 and 76 is equal to 1. In the outer peripheral surface of the final stage gear 76 an antenna member 78 having a plate-like antenna is fixedly disposed such that the plane of the antenna portion 78 has a certain angle in the up and down direction and is parallel to the lateral direction of a vehicle in the left and right direction. A mirror supporting member 80 is fixedly formed in the inner peripheral surface of the mirror body 70. The mirror supporting member 80 constitutes a mirror angle adjustment mechanism, and supports a shaft of a mirror 82 pivotally in the up and down direction.

With the above-mentioned construction, the mirror angle adjustment in the left and right direction is performed by pivoting the mirror body about the axis of the gear 68 in the left and right direction. FIG. 10 shows that a mirror angle adjustment in the right direction is performed from the posture as shown in FIG. 8. The gears 74 and 76 follow the pivoting movement of the mirror body 70, and rotate on their own axes and rotate around the gear 68. Since the gear ratio of the front gear 68 to the intermediate gear 74 and the gear ratio of the rear gear 76 to the intermediate gear 74 are set to be equal to each other, the final-stage gear 76 does not rotate relative to the first stage gear 68. As a result, the angle of the antenna 78 remains unchanged. The adjustment of the mirror angle can be performed by pivoting the mirror 82 in the up and down direction relative to the mirror supporting portion 80. These angle adjustment mechanisms in the left and right direction and the up and down direction are designed to generate an appropriate frictional force at the respective pivoting portions so that the adjusted angle can be maintained. With the above-mentioned second and third embodiments, although the total stage number of gears is equal to 3, the present invention is not limited to this but it is possible to use 5-stage gears, 7-stage gears, and so on. In this case, for example, the teeth numbers of gears of odd number stages should be equal to each other. Furthermore, the present invention is not limited to the ETC system but also applicable to other systems, for example, electronic wave beacon and the like of the VICS and the like.

Other aspects and advantages of the present invention can be obtained through a study of the drawings, the disclosure and the appendix claims.

What is claimed is:

1. A vehicle interior mirror comprising:

a mirror body;

a mirror attached to the mirror body;

a stay connected to the mirror body to hold the mirror body; and an antenna connected to the stay and provided in the mirror body, the mirror body being relatively movable with respect to the stay independently of movement of the antenna.

2. The vehicle interior mirror according to claim 1, wherein the stay is connected to the mirror body via a flexible joint.

3. The vehicle interior mirror according to claim 2, wherein the flexible joint comprises, a retaining member connected to the mirror body, and a sliding member which is retained in the retaining member to be slidable in the retaining member, the sliding member being connected to the stay and the antenna.

4. A vehicle interior mirror comprising:

a mirror body;

a mirror attached to the mirror body, a stay connected to the mirror body to hold the mirror body, the mirror body being relatively movable with respect to the stay;

an antenna connected to and provided in the mirror body, the antenna being relatively movable with respect to the mirror body; and a link connecting the stay and the antenna and configured to move the antenna according to a movement of the mirror body such that the antenna is directed to a substantially constant direction with respect to a vehicle.

5. The vehicle interior mirror according to claim 4, wherein the link comprises, a first gear fixed to the stay and connected to the mirror body rotatably around a first axis, at least one second gear engaging with the first gear and connected to the mirror body rotatably around a second axis, a number of the at least one second gear being an odd number;

a third gear engaging with the at least one second gear and connected to the mirror body rotatably around a third axis, the antenna being fixed to the third gear.

6. The vehicle interior mirror according to claim 5, wherein the first, second and third axes extend substantially in parallel and along a lateral direction of the vehicle.

7. The vehicle interior mirror according to claim 6, wherein said mirror body supports the mirror via a mirror angle adjustment mechanism for adjusting a mirror angle in left and right directions.

8. The vehicle interior mirror according to claim 5, wherein a gear ratio of the first gear and the third gear is set to be 1.

9. The vehicle interior mirror according to claim 5, wherein the first, second and third axes extend substantially in parallel and along a substantially vertical direction.

10. The vehicle interior mirror according to claim 9, wherein said mirror body supports the mirror via a mirror angle adjustment mechanism for adjusting a mirror angle in up and down directions.

* * * * *